March 23, 1965     R. A. OLSEN ETAL     3,174,605
SELF-ALIGNING CENTRIFUGAL CLUTCH SHOE
Filed Oct. 1, 1962     2 Sheets-Sheet 1
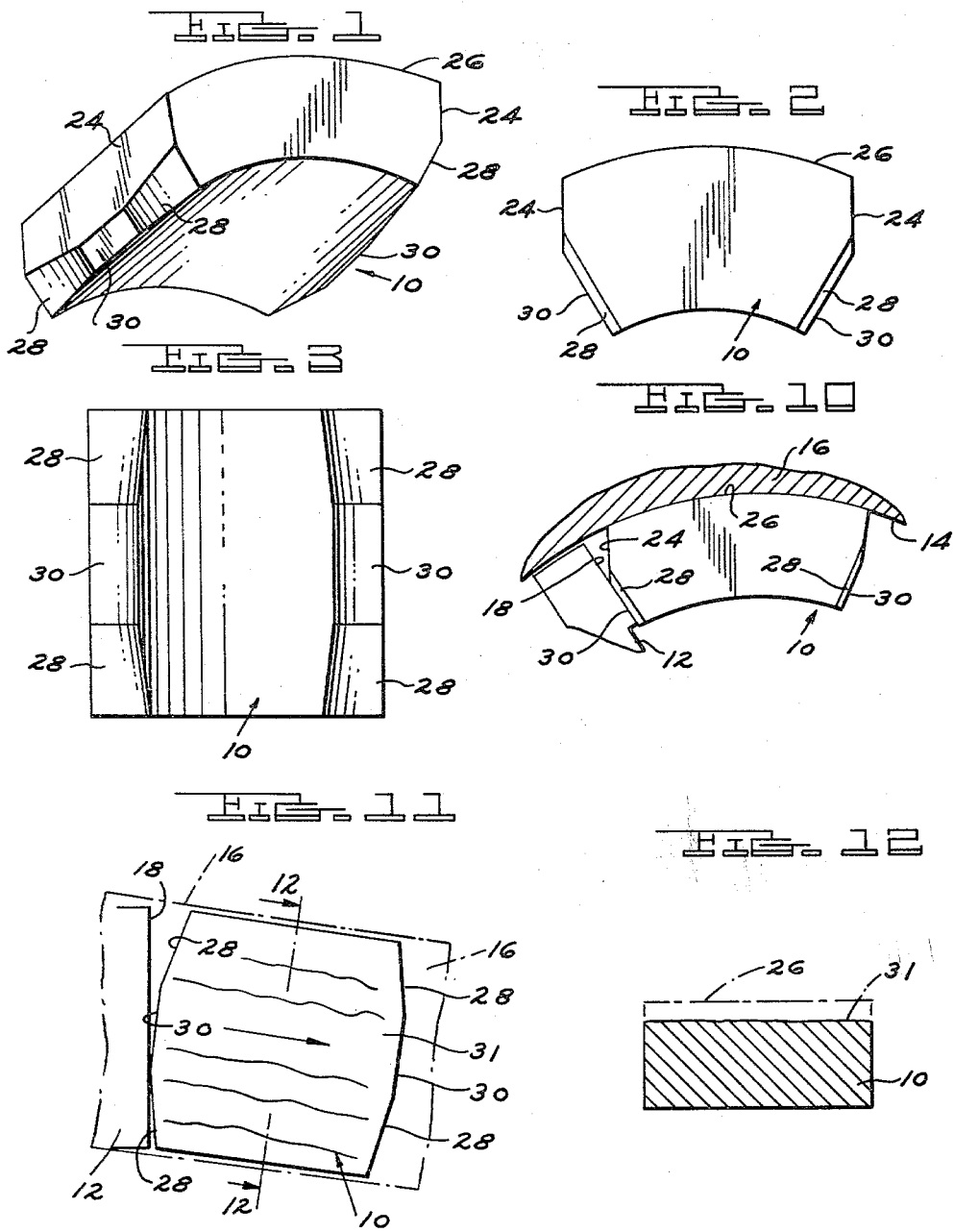
INVENTORS
RALPH A. OLSEN
JOEL G. BUSSELL
BY Whitemore, Hulbert
  Belknap
ATTORNEYS March 23, 1965 R. A. OLSEN ET AL 3,174,605
SELF-ALIGNING CENTRIFUGAL CLUTCH SHOE
Filed Oct. 1, 1962 2 Sheets-Sheet 2

INVENTORS
RALPH A. OLSEN
BY JOEL G. BUSSELL
Whittemore, Hulbert & Belknap
ATTORNEYS

United States Patent Office 3,174,605
Patented Mar. 23, 1965

3,174,605
SELF-ALIGNING CENTRIFUGAL CLUTCH SHOE
Ralph A. Olsen, Grosse Pointe Woods, and Joel G. Bussell, Detroit, Mich., assignors to Formsprag Company, Warren, Mich., a corporation of Michigan
Filed Oct. 1, 1962, Ser. No. 227,289
10 Claims. (Cl. 192—107)

The present invention relates to a new and improved self-aligned type of clutch shoe for a centrifugal clutch. More particularly, the invention relates to a clutch shoe having built-in features for minimizing or eliminating unevenness of wear on it in engaging against a coacting clutch drum or race, as propelled by the conventional separator of the clutch, by which separator the shoe is also radially guided in its centrifugal action.

For simplicity, the shoe is shown herein as being an un-lined or un-faced one. However, it will be understood that the improvements of the invention, since they relate basically to the structure only of the metal shoe body, will have their corresponding effects in a lined and un-lined clutch shoe.

In either case, it is an object of the invention to provide for an improved and uniform wearing of the shoe against the clutch drum or race against which it is engaged, as by preventing a tendency of the shoe to wedge against and between the race and the driving separator of the clutch, which tendency arises in the event angle tolerance dimensions do not match, as between the rear face of the shoe and the separator which has guiding and driving engagement therewith.

Another object is to provide an improved centrifugal clutch shoe which will wear evenly against the clutch drum or outer race despite possible misalignment of the shoe separator in relation to the axis of the drum or race.

A still further object is to provide a shoe which cannot possibly become de-energized due to noncompatibility with the angularity of the separator, such as might cause a minor portion of the shoe to take frictional engagement with the drum or race under the critical energizing centrifugal force.

In accordance with the invention, the circumferentially facing end surfaces of the shoe are relieved at the axially spaced corners thereof, for the purpose of allowing the shoe to align itself automatically with the drum in cases of non-parallelism or misalignment of the clutch separator and drum. In another respect, the improved shoe has the front and rear outer radial corners thereof sharply cut away or relieved to insure a radially lower contact of the separator with the shoe, and thereby prevent tendency of the shoe to wedge against drum and separator, or to de-energize along part of its arcuate surface, thereby bringing excessive wearing friction to bear upon the remaining trailing portion of the arcuate surface. The front and rear circumferentially facing ends of the shoe are modified identically in the foregoing respects, in the interest of affording interchangeability in regard to the orientation of the shoe within the drum and between its separators.

More specifically, it is an object of the invention to provide an improved clutch shoe in accordance with the preceding paragraph in which, in alternative embodiments, the relieving of the driven rear circumferential shoe surface may be accomplished either along flat surfaces or by rounding the rear end in blending, radially and axially extending curves.

It is to be understood that in the present specification and the claims to follow, reference to the separator of the clutch is to be construed as being inclusive of various known and equivalent types of shoe contacting power input member, or shoe driving and locating member.

The foregoing as well as other objects will become more apparent as this description proceeds, especially when considered in connection with the accompanying drawings illustrating the invention, wherein:

FIG. 1 is an isometric view of one of the improved shoes of the invention, as viewed from the bottom and rear portion thereof, in accordance with one embodiment of the invention;

FIG. 2 is an axial end view of the shoe;

FIG. 3 is a bottom plan view of the shoe;

FIG. 10 is a schematic view similar to FIGS. 4 and 6, showing the improved clutch shoe of the invention as installed in association with a drum and separator, and indicating one effect of the improvement in correcting the wedging and de-energizing conditions represented in FIGS. 4 and 6, respectively;

FIG. 11 is a fragmentary plan view like FIG. 8, illustrating the effect of a further improvement in the clutch shoe in eliminating an undesirable angular wear pattern represented in FIG. 8;

FIG. 12 is a view in transverse section on a radial plane along line 12—12 of FIG. 11.

Figure 4:
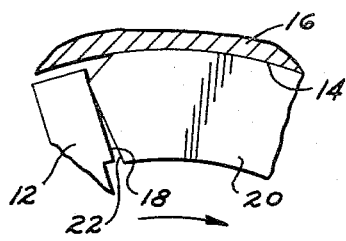
FIG. 4 is a schematic fragmentary view in axial elevation showing a conventional, prior art construction of a centrifugal clutch shoe and a special condition which may arise in its operation, as under a condition of pronounced or severe vibration, due to a lack of match of angle dimensions of the shoe and a separator by which it is driven and radially guided in the operation of the clutch.
Figure 5:
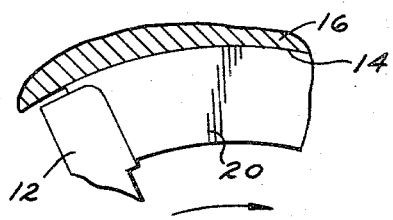
FIG. 5 is a schematic view showing in exaggerated degree, the pattern of shoe wear which arises due to swagging and resultant wedging or jamming under the condition typified in FIG. 4.

Referring first to FIGS. 1, 2 and 3, the improved self-aligning clutch shoe of the invention is generally designated by the reference numeral 10. FIGS. 10, 11 and 12 show this shoe as one of several (not shown) assembled between radial separators of an internal driving member (one such separator being designated 12) for coaction with a cylindrical race surface 14 of a conventional rotating, driven clutch drum 16. It is to be understood that the separator and drum components are entirely conventional in nature; and it is to be equally well understood that in certain clutches there may be a substantial departure from a proper match of the forward shoe, rearwardly engaged by a driving surface 18 of the separator (assuming its direction of rotation being that of the arrow in FIG. 10), relative to the radially extending trailing surface of the shoe. Likewise, there often arises a condition in which there is a misalignment of the surface relative to a longitudinal plane through the axis of the drum 16. Prior to further description of the structural features of the improved shoe 10, it is believed that it will be helpful to an understanding of the principles of the invention to make reference to FIGS. 4 through 9, which schematically illustrate nonbalanced conditions of the sort just described which frequently occur in conventional prior art centrifugal clutches.

Thus, FIG. 4 shows an arrangement of conventional clutch shoe 20 relative to separator 12 and drum 16 in which there is a discrepancy and lack of matching angularity between the guiding and driving face 18 of separator 12 and the trailing face 22 of shoe 20. From this there arises an outward concentration of the driving force from separator 12 at the radially outermost rear edge of the shoe above its rear face 22; and this, under severe vibrational and torsional wearing effects in the operation of the clutch over a long period of time, tends to result in the swaging or extrusion of shoe 20 to wedge or jam the same between drum 14 and separator face 18, such as is depicted (in exaggerated degree) in FIG. 5 of the drawings, by the time the face comes radially flush with the rear shoe surface 22. Since it is impractical or impossible to unfailingly produce and install shoes and separators in which the faces 18, 22 will unfailingly have matching angle tolerances, the result shown in FIG. 5 will arise under the condition or relationship of shoe and separator depicted in FIG. 4.

Figure 6:
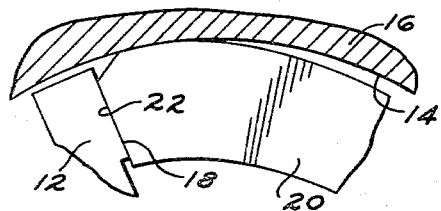
FIG. 6 is a schematic view similar to FIG. 4 illustrating another condition which may arise in the operation of the conventional clutch of the prior art due to lack of compatibility of angle tolerances of shoe and separator.
Figure 7:
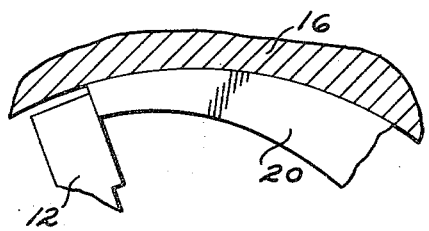
FIG. 7 is a schematic view similar to FIG. 6 showing the undesirable non-uniform and localized pattern of shoe wear arising from the condition of FIG. 6.

FIG. 6 shows another condition which may arise when angle tolerances are not compatible, in that the shoe 20 will depart from contact with the drum race surface 14, while maintaining flush engagement of its trailing face 22 with the forward face 18 of separator 12. To the extent of this separation the clutch shoe de-energizes, and continued wear against the drum produces the pattern of non-uniformly trailing edge wear on the shoe 20 which is illustrated in FIG. 7 of the drawings. This results purely from the undue concentration of frictional wearing engagement at the trailing edge of the shoe, as distinguished from vibrational wearing and torsional effects between shoe and separator, such as result from the condition of FIG. 4.

Figure 8:
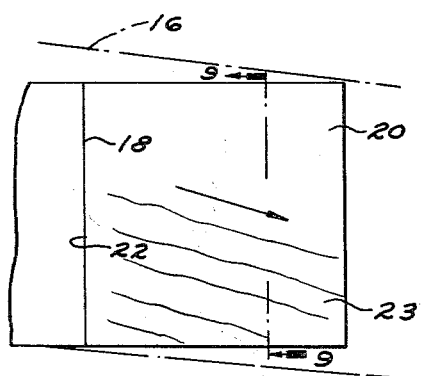
FIG. 8 is a schematic fragmentary top plan view showing the result, in non-uniform or localized shoe wear due to a condition of non-parallelism of the trailing edge of a prior art clutch shoe, and its contact with the clutch separator, relative to the axis of the clutch drum, indicated in dot-dash line.
Figure 9:
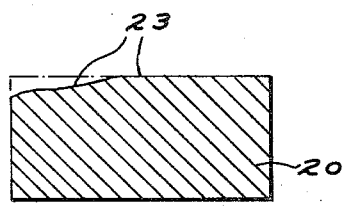
FIG. 9 is a view in cross section on a transverse radial plane on line 9—9 of FIG. 8.

Under other circumstances, the forward face 18 of the separator, along which it engages the trailing face 22 of shoe 20, may lack true parallelism to a plane through the axis of the drum 16. Under this condition, with the shoe and separator engaging flush across the area of the faces 18, 22, wear on the arcuate surface of shoe 20 will take place, as suggested by the reference numeral 23 and wavy lines of FIG. 8, at an angle to the front-rear orientation of the shoe, or in the general direction of the arrow of FIG. 8, resulting in a lack of uniformity of distribution of wear across the drum engaging surface of the shoe 20, as illustrated in FIG. 9 of the drawings. Since there always exists the possibility of angular misalignment of the drum and driving halves of the clutch, the condition represented by FIGS. 8 and 9 is another with which the improvements of the subject clutch shoe deal.

To this end, FIGS. 1, 2 and 3 should be referred to in conjunction with FIGS. 10, 11 and 12, showing the action of the improved shoe in correcting the undesirable effects mentioned in connection with FIGS. 4–9. As shown in these figures shoe 10 has its radially outward forward and rearward ends abruptly cut back or relieved along a planar flat area or surface 24 which diverges sharply outwardly and circumferentially from the radial face 18 of separator 12, from approximately the radial midpoint of shoe 10, through the outer arcuate, race-engaging surface 26 of the shoe.

Thus, referring to FIG. 10, insurance is had that the face 18 of separator 12 will engage the shoe 10 only adjacent its lower or radially innermost trailing corner; and thus the wedging effect after prolonged vibration is avoided which is set up when the separator surface 18 engages the shoe locally only at its outer trailing edge, as in FIG. 4.

Still, the engagement of separator face 18 at the radially inner portion thereof with the trailing surface of the shoe 10 is such as to maintain the necessary force couple counterclockwise (FIG. 10) upon a shoe which will keep its arcuate surface 26 in full, flush engagement with the drum race 16 to prevent the de-energizing action depicted in FIG. 6, with the resultant non-uniform pattern of shoe wear shown in FIG. 7.

Furthermore, in addition to the abrupt cropping off of the shoe at the surface 24, the remaining end part of the shoe is relieved circumferentially forwardly and axially outwardly at 28 from a central area 30 beneath the surface of face 24. Thus, as illustrated in FIG. 11, the shoe 10 is able to rock on surfaces 28 and 30 against the forward face 18 of separator 12, and thus take a proper position relative to a drum 16 which may be somewhat misaligned in reference to the face 18. As indicated in FIG. 12, the shoe 10 is able to position itself in a direction corresponding to the direction of rotation of the drum (indicated by arrow in FIG. 11), so that the wear pattern on the shoe, indicated by wavy lines and the reference numeral 31 in FIGS. 11 and 12 more nearly parallels the plane of rotation of drum 16. The result is that wear is distributed more uniformly across the drum engaging surface 26 to shoe 10, as depicted in FIG. 12 of the drawings, as compared with FIGS. 8 and 9.

Figure 13:
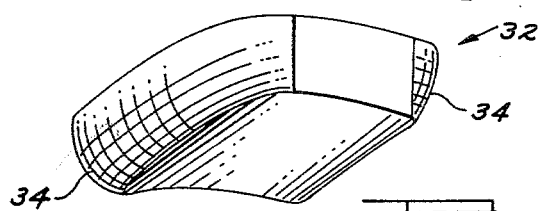
FIG. 13 is an isometric view, somewhat similar to FIG. 1, of a shoe in which the self-alignment producing surface of the shoe is along compound blending curvatures, as an alternative to the flat surfaced areas of the other figures.

As shown in FIG. 13 of the drawings, the shoe may also be produced in an alternative embodiment, generally designated 32, in which the front and rear ends thereof are contoured in the form of convexly rounded surfaces 34, including blending components curved in both the axially extending and the radially extending directions, thus to produce the desired relation of such driven portions for the self-aligning purposes described above, having all of the advantages referred to in connection with FIGS. 1, 2, 3 and 10 through 12.

The result of all of the foregoing features of improvement of the shoe 10 is an improvement in the load bearing capability of the individual shoes and the clutch as a whole, and a longer life of satisfactory operation. As previously indicated, in the interest of interchangeability it is desirable to shape both the leading and trailing ends of the shoe 10 by the provision of the relieved surfaces 24, 28 and 34 described above; and as also indicated above, though the improvements are illustrated as applied to a non-lined shoe, they are equally applicable to a shoe which is conventionally lined with an appropriate, non-metallic or metallic facing material or materials.

Of course, when reference is made hereinabove and in the claims to follow to the relieving of the shoe in the ways mentioned, the relief is made on the basic shoe proper, as distinguished from any non-metallic friction facing which might be carried thereby, although the relief may also be incidentally carried out into such facing. The significant matter is that it is a relieving in respect to a circumferential driven shoe end which is directly engaged by a separator or driver, which relieving insures the shoe against damage, undue wear or diminished efficiency due to faulty driving engagement on account of misalignment of shoe and separator parts.

Whether the end surface engaged by the shoe driving part 12 is designated to be relieved in the radially and axially extending direction along flat planes, or whether such engaged surface is contoured in the form of a circumferentially, radially and axially convex, blended curve, the shoe is enabled to be engaged by the part 12 along a localized zone or area which is small by comparison with the total exposed end surface area of the shoe, with the various advantages in point of self-alignment, reduction in wear, and the like which have been referred to above.

What we claim as our invention is:

1. A centrifugal clutch shoe provided with an outer arcuate, circumferentially extending surface adapted for clutching engagement under centrifugal force with a cylindrical clutch race, said shoe having circumferentially spaced end portions extending generally radially of said arcuate surface, at least one of said end portions including an end surface in a generally radial plane and adapted to be engaged by a clutch separator, a surface diverging radially outwardly and circumferentially from said end surface in the direction of said arcuate surface, and a further end surface diverging axially and circumferentially from one axial end of said first named end surface.

2. A centrifugal clutch shoe provided with an outer arcuate, circumferentially extending surface adapted for clutching engagement under centrifugal force with a cylindrical clutch race, said shoe having circumferentially spaced end portions extending generally radially of said arcuate surface, at least one of said end portions including a radially inner end surface in a generally radial plane and adapted to be engaged by a clutch separator, a surface diverging radially outwardly and circumferentially from a radially outer limit of said end surface in the direction of said arcuate surface and intersecting the latter, and a further end surface diverging axially and circumferentially from one axial end of said first named end surface.

3. A centrifugal clutch shoe provided with an outer arcuate, circumferentially extending surface adapted for clutching engagement under centrifugal force with a cylindrical clutch race, said shoe having circumferentially spaced end portions extending generally radially of said arcuate surface, at least one of said end portions including a radially inner end surface in a generally radial plane and adapted to be engaged by a clutch separator, a surface diverging radially outwardly and circumferentially from a radially outer limit of said end surface in the direction of said arcuate surface and intersecting the latter, and a pair of further end surfaces diverging axially and circumferentially from said first named end surface at opposite axial ends of the latter.

4. A centrifugal clutch shoe provided with an outer arcuate, circumferentially extending surface adapted for clutching engagement under centrifugal force with a cylindrical clutch race, said shoe having circumferentially spaced and facing end portions extending generally radially of said arcuate surface, at least one of said end portions being adapted to be engaged by a clutch drive member and being relieved circumferentially in the direction toward the other end portion at at least one of the axial limits of said engaged end portion, and being circumferentially relieved at at least one of the radial limits of said engaged portion, thus to enable a localized engagement of said last named end portion by said drive member, as compared with the full area of said last named portion.

5. A clutch shoe in accordance with claim 4, in which the relieving of said engaged end surface is at least in part along a plane.

6. A clutch shoe in accordance with claim 4, in which the relieving of said engaged end surface is at least in part along a circumferentially convex curved surface.

7. A clutch shoe in accordance with claim 4, in which the relieving of said engaged end surface is at least in part along a circumferentially, radially and axially convex curved surface.

8. A centrifugal clutch shoe adapted to be drivingly engaged by a clutch drive member, said shoe being provided with an outer arcuate, circumferentially extending surface, and an inner circumferentially extending surface, said shoe having circumferentially spaced and facing end portions extending generally radially thereof and terminating radially outwardly and inwardly at said respective circumferentially extending surfaces, thus to define the radial and circumferential outline of the shoe, at least one of said end portions being engageable by said clutch drive member at a radially inner part thereof terminating inwardly at said inner circumferentially extending surface, said one end portion being relieved circumferentially and radially in the direction toward the other end portion in a part thereof just radially outward of said inner part, thus adapting said one end portion to be engaged by said drive member at said inner part in a local area of small size as compared with the full area of said one end portion.

9. A centrifugal clutch shoe having a metal body adapted to be drivingly engaged by a clutch drive member, said shoe body being provided with an outer arcuate, circumferentially extending surface, and an inner circumferentially extending surface, said shoe body having circumferentially spaced and facing end portions extending generally radially thereof between axial side faces of said body and terminating radially outwardly and inwardly at said respective circumferentially extending surfaces, thus to define the radial and circumferential outline of the shoe body, at least one of said end portions being engageable by said clutch drive member at a radially inner part thereof terminating inwardly at said inner circumferentially extending surface, said radially inner part being relieved at at least one of the axial limits of said inner part of said one end portion in the circumferential direction toward the other end portion and also relieved in a lateral direction through an axial side face of the shoe body, thus adapting said one end portion to be engaged by said drive member at said inner part in a local area of small size as compared with the full area of said one end portion.

10. A centrifugal clutch shoe adapted to be drivingly engaged by a clutch drive member, said shoe being provided with an outer arcuate, circumferentially extending surface, and an inner circumferentially extending surface, said shoe having circumferentially spaced and facing end portions extending generally radially thereof and terminating radially outwardly and inwardly at said respective circumferentially extending surfaces, thus to define the radial and circumferential outline of the shoe, at least one of said end portions being engageable by said clutch drive member at a radially inner part thereof terminating inwardly at said inner circumferentially extending surface, said one end portion being relieved circumferentially and radially in the direction toward the other end portion in a part thereof just radially outward of said inner part, said radially inner part being relieved circumferentially and axially in the direction toward said other end portion at at least one of the axial limits of said one end portion, thus adapting said one end portion to be engaged by said drive member at said inner part in a local area of small size as compared with the full area of said inner part of said one end portion.

References Cited by the Examiner
UNITED STATES PATENTS 2,991,865  7/61  Wilson _____ 192—105

FOREIGN PATENTS 180,417  5/22  Great Britain.
206,699  11/23  Great Britain.
209,456  1/24  Great Britain.

DAVID J. WILLIAMOWSKY, *Primary Examiner.*